H. A. SMITH.
METHOD OF AND APPARATUS FOR PRODUCING PICTURES BY PROJECTION.
APPLICATION FILED DEC. 30, 1920.
1,394,797.
Patented Oct. 25, 1921.
3 SHEETS—SHEET 2.
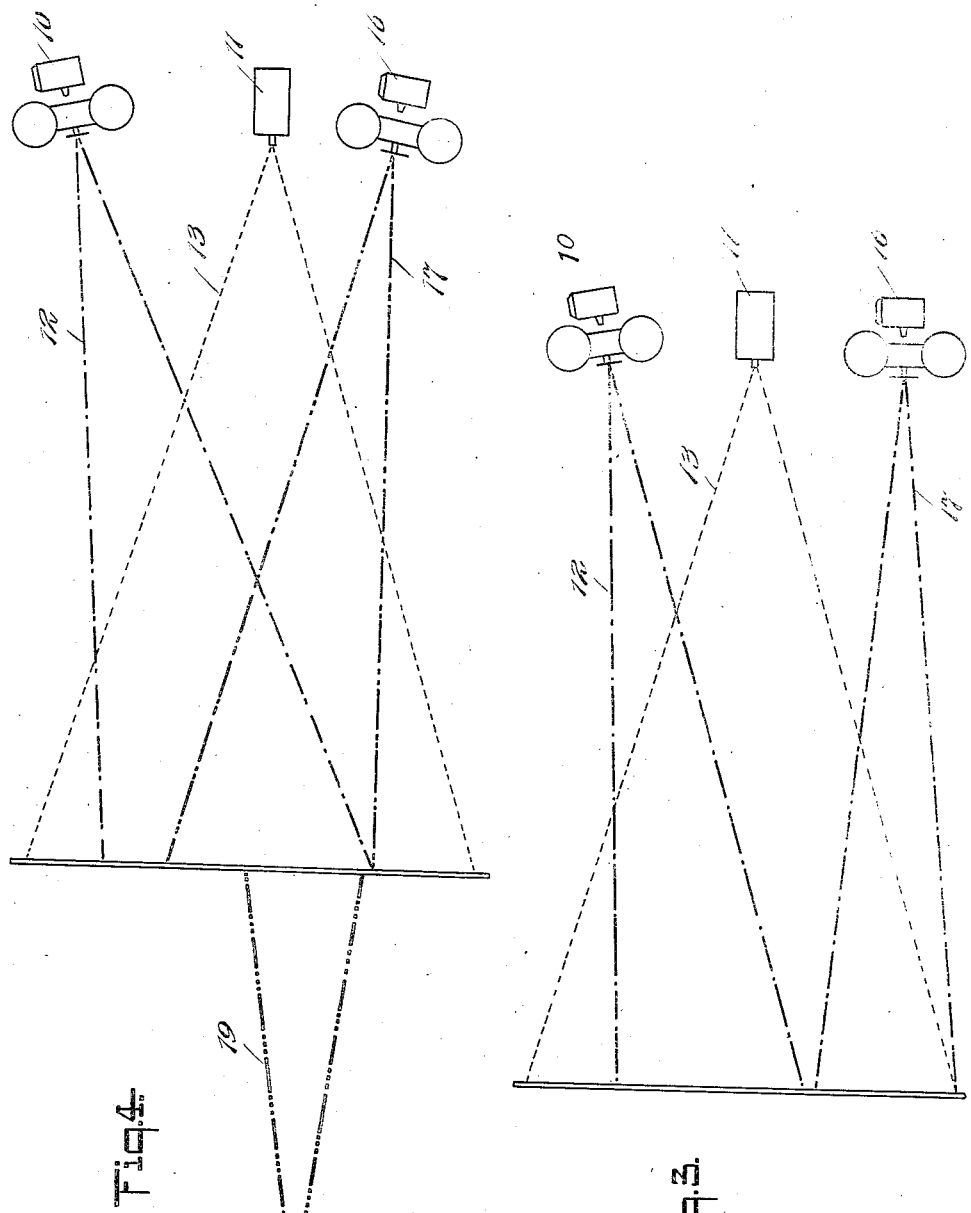
INVENTOR
H. Armour Smith
BY
ATTORNEYS H. A. SMITH.
METHOD OF AND APPARATUS FOR PRODUCING PICTURES BY PROJECTION.
APPLICATION FILED DEC 30, 1920.
1,394,797.
Patented Oct. 25, 1921.
3 SHEETS—SHEET 3.
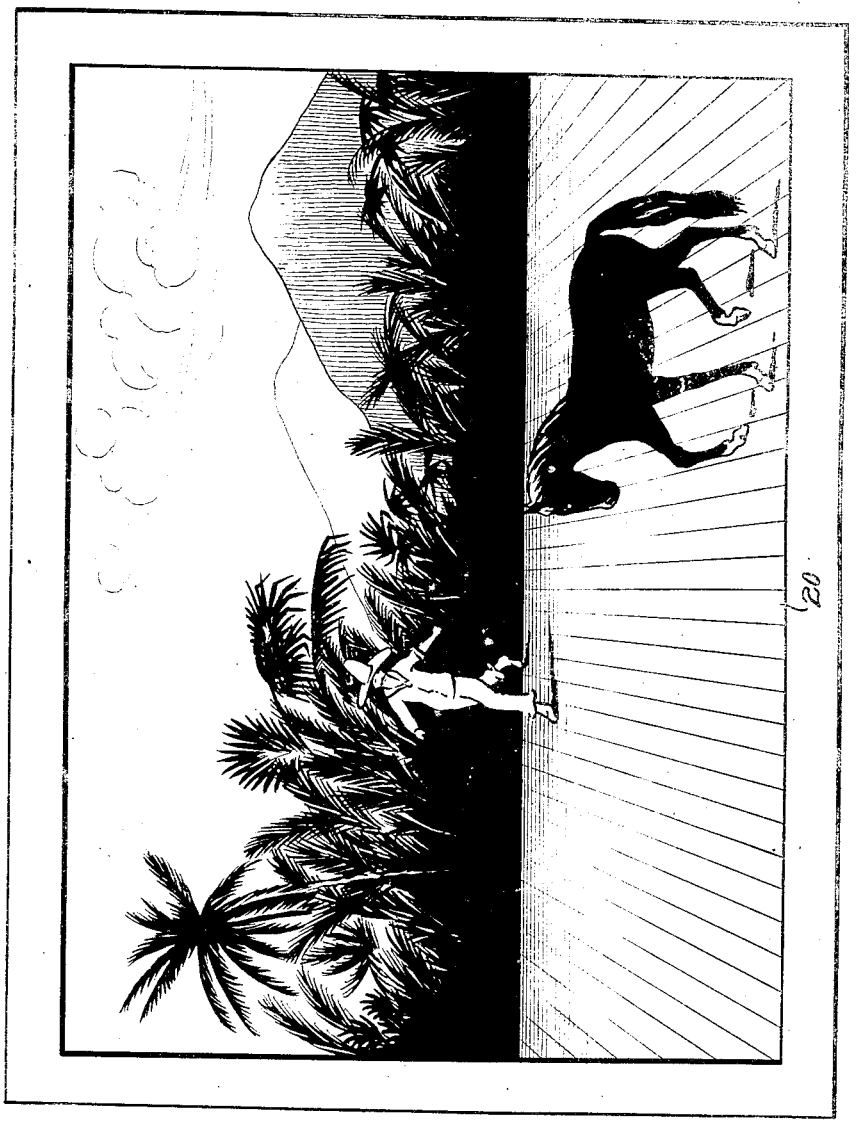
INVENTOR
H. Armour Smith
BY
ATTORNEYS

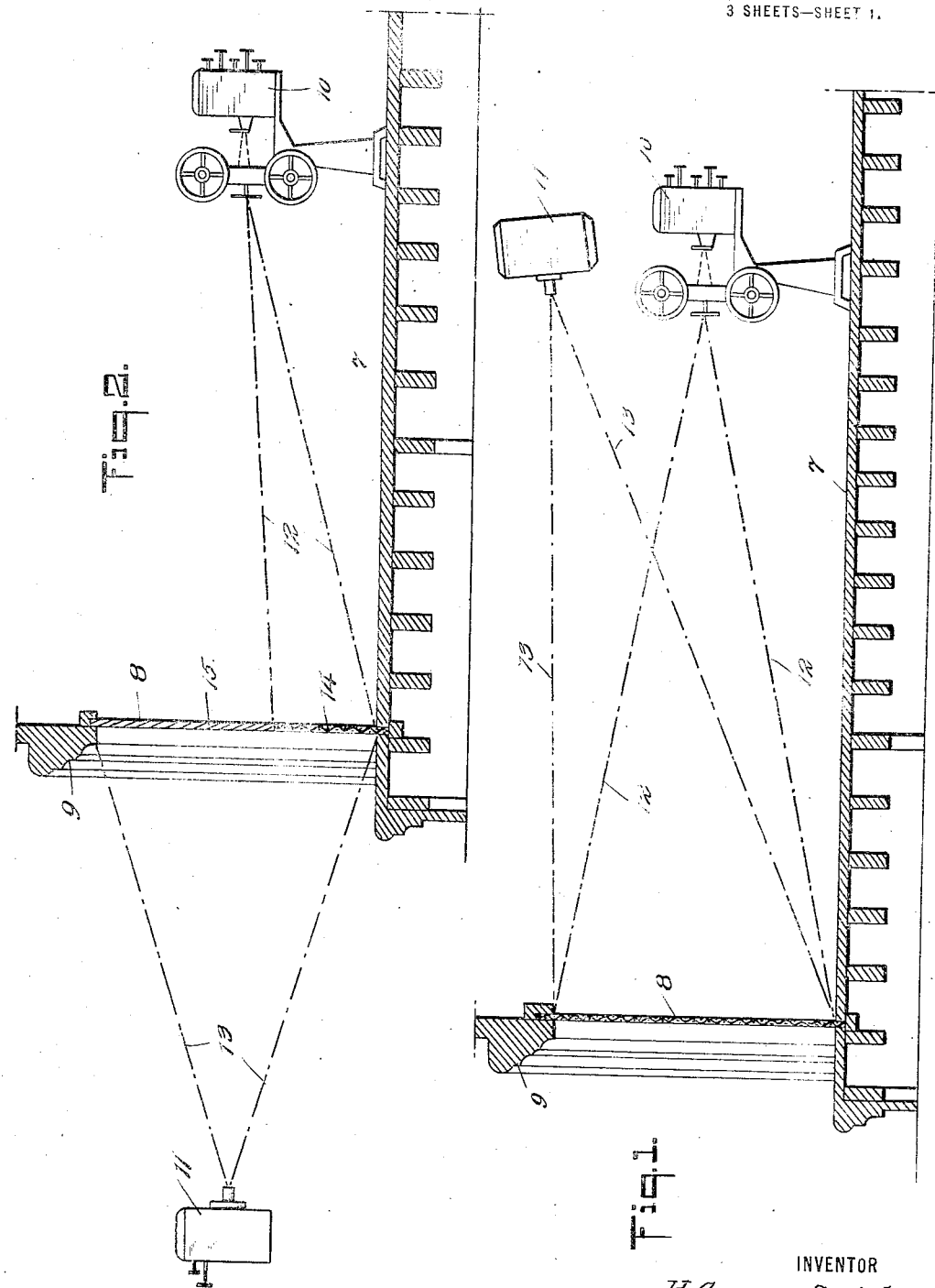

UNITED STATES PATENT OFFICE.

HERMAN ARMOUR SMITH, OF YONKERS, NEW YORK, ASSIGNOR OF ONE-HALF TO EDGAR J. MARSTON, OF GREENWICH, CONNECTICUT.

METHOD OF AND APPARATUS FOR PRODUCING PICTURES BY PROJECTION.

1,394,797. Specification of Letters Patent. Patented Oct. 25, 1921.

Application filed December 30, 1920. Serial No. 434,037.

*To all whom it may concern:*

Be it known that I, HERMAN ARMOUR SMITH, a citizen of the United States, residing at Yonkers, county of Westchester, and State of New York, have invented new and useful Improvements in Methods of and Apparatus for Producing Pictures by Projection, of which the following is a specification.

My invention relates to certain new and useful improvements in the method of and apparatus for producing pictures by projection upon a screen or other suitable surface. Such projected pictures, especially in the form of photographic motion pictures, have gone into extensive use and serve many useful purposes, but, as they are merely the projection upon a plane surface of photographic views, they possess the usual characteristics of a photograph, and the subjects disclosed appear flat and unplastic and lack any appearance of solidity or relief.

It has long been recognized that, if this feature or limitation could be overcome, and a projected picture made which would have the characteristics of solidity, depth and perspective attendant upon ordinary or binocular vision, the results would be most desirable; and many attempts have heretofore been made to that end.

Such effects have been produced by means of an instrument known as a stereoscope (in exhibiting photographic pictures) but no satisfactory application of this instrument, or of its principles, has heretofore been made to the art of projected pictures. Good stereoscopic effects, however, have been produced upon a screen by means of reflecting mirrors and the like. Such apparatus and methods, however, do not meet all commercial requirements, as they involve the use of more or less cumbersome and special apparatus.

It is an object of this present invention to overcome these difficulties and to provide a method and means for projecting pictures upon a screen,—which pictures will possess the appearance of solidity, depth and perspective of a stereoscopic view,—and to accomplish this result with simple, standard and inexpensive apparatus, and without the necessity of a considerable investment in new and special appliances.

By my present methods and apparatus, I am able to produce the desired result in a simple, efficient and economical manner and to obtain the production of a picture which closely approximates a view which the spectator would have of the scene itself, and to do this without the installation of special appliances.

In addition, I am enabled to produce many new and beautiful effects; and, by combining my present methods with those employing mirrors, I am enabled to obtain illusions and results which have been heretofore impossible.

To afford a better understanding of my invention, I would first call attention to certain optical laws and phenomena.

The appearance of solidity, relief and perspective, belonging to ordinary vision, is undoubtedly attributable in part, at least, to the phenomena of binocular vision. In such case, two images of an object are formed on the retinas of the two eyes, which images differ slightly from each other because of the divergence of the rays from each point of the object. The effect of these two images upon the brain, however, is that of a single object seen in perspective relief. My experiments, however, seem to indicate that the effect of binocular vision involves a further circumstance, namely, that resulting from the unconscious automatic focusing of the eye upon the particular object or image to which the attention is directed. In ordinary vision, the eye unconciously focuses itself upon that portion of the view which is at that particular time under observation, whether it is in the foreground, middle distance, or extreme distance; and thus the object viewed is seen with approximately the maximum sharpness of which the eye is capable.

A photographic view, especially one involving considerable range of distance, obviously fails to more than approximate a brain picture of the same natural view; for the ordinary photographic lens, while affording sufficient definition of some particular object upon which it is focused, necessarily leaves other objects at different distances more or less out of focus. Thus, only those parts of a photographic picture, which are in accurate focus, approximate the appearance of an ocular view thereof, and, in the making of photographs and moving pictures, it is customary to focus upon the objects which are regarded as most important. Sometimes, where objects at different distances are of equal or comparable importance, a compromise in focus is made, and, in fact, this is very frequently done.

In the production of most projected pictures, a photographic print or positive is employed which is known as a "slide" or "film". Light-rays, originating at some source of light, are directed through suitable lenses and such a slide or film to impinge upon a suitable screen. The screen is of such a character that substantially all of the incident rays impinging upon it are diffused, and each point of the screen becomes a separate source of reflected light. The slide or film contains a photographic record of the scene or objects depicted, the high lights being represented by more or less transparent sections, whereas the shadows are more or less opaque. The density of the film or slide will vary from complete opaqueness to substantial transparency, and the light rays passing through the slide or film reach the screen in an intensity corresponding to the transparency of the particular portion of the slide through which they pass. Thus the rays which strike a high light or transparent portion are substantially unobstructed; while those rays which strike the opaque portion of the slide are completely interrupted and do not reach the screen at all, rendering it black or shaded at those points. Hence the picture produced upon the screen results from the contrast effected by the different intensities of the illumination of the several portions thereof; and this amount is governed by the varying character of the slide.

In order to obtain the necessary illumination, the screen should possess high diffuse reflective properties, and those which have proven most satisfactory are white or of a light color, although metallic coated screens have been found to serve the purpose. Irrespective of the particular character of the screen used, the pictures projected thereon will contain high lights and shadows, verging onto the dark or even black; and I have discovered that it is possible to project a plurality of pictures upon a single screen in such a way as to produce a unitary result, giving the effect of but a single picture; and by so doing I obtain a picture which not only possesses a greater definition,—and therefore a more nearly natural appearance,—but one which also possesses to a high degree the character of a stereoscopic or binocular view.

Generally stated, one method is as follows: A photographic picture is taken of the view which is to form the background and a background slide or film is made therefrom. In the making of this picture, the nature of the picture which may be superposed thereon is carefully considered; and care is taken to see that all portions of the background, against which the superposed picture is to be projected, are darker in color or value than the adjacent portion of the picture it is proposed to superpose. A photographic negative is then made of the picture to be superposed; for instance, a moving picture of a dancer; and this latter picture is taken against a light-absorbing background, such as a curtain of black velvet. A positive is then made from this negative, and, upon its being projected simultaneously with the background slide upon the same screen, the resulting view will be startlingly lifelike and distinct; and, in addition, the object, forming the subject-matter of the latter film, will have the appearance of solidity and relief, and very closely approximate the effect obtained by binocular vision.

It will be understood that the foregoing description constitutes the one simple form of my invention, and that not only two but several pictures may be superposed upon a single screen to produce a composite or unitary result. In such cases it is of course necessary to see that the light values of the several pictures contain sufficient contrast at adjacent points to insure the proper definition. By this method, each of the several pictures to be superposed may be focused as sharply as desired so that the composite picture will more closely approximate the natural view of the subjects.

It will be understood that in practising this method a plurality of pictures may be imposed either from the front or rear, or one or more from either side in combination with one or more from the other side. Where all of the pictures are projected from the front an opaque screen may be employed, but where one or more of them are projected from the rear, a translucent screen, or one at least having a translucent section, will be required.

In all such cases the light intercepting and controlling devices, i. e., the films, plates, color screens, etc., associated with each projecting machine are carefully selected, arranged and correlated so that a preconceived image is produced thereby. Furthermore the image so conceived is unlike the other image or images to be superposed by simultaneous projection of the two images. The arrangement in general is such that any part of the screen is illuminated by one and the only one projecting machine producing an image in contrast with the surrounding field of darkness as determined by the other machine or machines.

In the drawings I have illustrated diagrammatically several typical forms of my invention, but it will be understood that these are but illustrations of the many which may be used. In these drawings, Figure 1 is a side elevation showing a screen and supporting platform in section and the means for simultaneously projecting two pictures upon the rear of the screen;

Fig. 2 is a view similar to Fig. 1 but it illustrates a method of simultaneously projecting two pictures upon opposite faces of the screen, a portion of the latter being translucent and the remainder opaque;

Fig. 3 is a diagrammatic view showing the projection of three pictures upon the same side of a screen;

Fig. 4, a similar diagrammatic view showing the projection of three pictures upon one side of a screen and a fourth picture upon the opposite side, and Fig. 5 is an illustration of a composite picture which I will hereinafter more particularly describe.

Similar characters of reference designate like parts throughout the several views. Referring now to the drawings in detail, and especially to the illustration of Fig. 1, 7 indicates a suitable supporting surface, such as a stage or platform of a theater or other exhibition hall, and 8 the screen, which is preferably supported at the rear of the proscenium indicated at 9. Located behind the screen, so that they are concealed from the vision of the audience or spectators, are the projecting machines 10 and 11, the former of which is shown as a moving picture machine and the latter as a stereopticon.

It will be observed that the cone of light indicated by the dot-and-dash lines 12, and that indicated by similar lines 13 projected by the machines 10 and 11, respectively, register or "frame" upon the rear surface of the screen 8, or any part thereof.

The screen 8, as used in the embodiment of my invention shown in Fig. 1, is translucent, and may be formed of ground glass, or any fabric or other material which is suitable to the purpose. I have found that a screen which gives highly satisfactory results, in the practising of my invention, may be made of satin-finish cotton-cloth in white, light tan, or light blue coated or impregnated with paraffin.

In the utilization of my invention, according to the embodiment shown in Fig. 1, the complete scene thrown upon the screen 8 consists of a background and a foreground, the latter of which is in motion and appears to be in front of the background. To obtain this foreground action, I have found it desirable to photograph the subject of the "action" against a light-absorbing background, such, for instance, as black velvet or other suitable material. This will obviously produce in the positive print a film or picture, wherein the "action" only will appear, the images of the subjects, which are transparent or nearly so, being clearly defined owing to the remainder of the film being opaque.

This method of producing the action affords much clearer definition thereof than may be obtained from a film wherein the entire scene, including the background, has been reproduced photographically, because in the former case extreme sharpness of detail may be had by closely focusing on the single subject, whereas in the latter case, owing to the same sharpness of focus on the subject rendering the background so much out of focus as to seriously impair or destroy the entire picture, an adjustment of the focus placing the subject somewhat out of focus is taken as a compromise.

The background scene may be an interior, landscape or any desired subject suitable to the presentation, and should preferably be of a nature in which a true, or substantially true, perspective is obtainable, as I have found that the value of the illusion is greatly enhanced where perspectives are employed.

In the preparation of the background scene, if photography is used, it is manifest that the subject of the background may be brought out with great clarity of definition, owing to the fact that the background alone (like the foreground action) is the subject of the photograph, and, therefore, is not subservient to anything which may subsequently appear in the foreground thereof.

The background scene, which may be a black and white, but, preferably a colored photograph, or a painted scene in the form of a lantern slide, is projected upon the rear surface of the screen 8 by the stereopticon 11. Simultaneously, the foreground action which may be the action of a story, play, or the like, photographed as previously described, is projected upon the same surface of the screen 8 by the motion picture machine 10, both of the machines 10 and 11 being so located and focused relative to the screen 8 as to produce registration of the cones of light 12, 13, upon said screen 8 in a manner whereby the action of the story and the background in superposed relation will form a complete scene within the frame of said screen.

In the projection of the background and the foreground, action upon the screen 8, as just described, the illumination of the foreground action may if necessary be intensified relatively to that of the background scene by the use of lamps, or the like, of a sufficiently higher candle-power in the projecting machine 10 than in the stereopticon 11. It must be understood, however, that the clarity of the background scene need not be impaired thereby, as the relative intensity of the illumination of the two projecting machines used may be so regulated as to preserve the full values of both pictures.

When the background scene and the foreground action are superposed and presented to the vision of the audience or onlookers, in the plane of the screen 8, the method of photography and projection which I employ imparts to the foreground action an appearance of solidity or plasticity, the figures or other objects in such action apparently possessing the three dimensions of length, breadth and thickness. Furthermore, the accentuation of the subjects in the foreground action by the proper proportioning of the illumination produced by the two machines 10 and 11, gives to such action the appearance of transpiring in a plane in front of the background scene. In other words, by the methods of photography and projection which are used in obtaining the foreground action, the figures in this action have a stereoscopic or relief effect and appear to occupy a plane or zone forward of the background scene.

As the subject of the story or action moves or traverses the screen in the presentation, this effect is constantly maintained irrespective of the coloring or light effects of the various portions of the background scene. This will be readily understood from the fact that the action possesses a preponderant degree of brilliancy which renders invisible the portions of the background, which it covers from time to time.

In practising my invention, I have found that various highly satisfactory effects or presentations may be obtained by the use of black and white pictures for producing both the background and foreground action. In such cases, the background may be tinted, toned, or otherwise colored so as to form a pleasing and harmonious contrast to the action or subjects in the foreground. The latter, being more highly illuminated thus stands out in bold relief. Many color contrasts or blends may be produced whereby spot-light and various other stage lighting effects may be obtained in the practising of my invention. It will, of course, be understood that the foreground scene or action may be black and white, while the background is colored by the use of spot-light or other coloring effects.

In the form of my invention shown in Fig. 1, I have illustrated and described a presentation embodying a still background projected by the stereopticon 11 and a moving foreground scene projected by the moving picture machine 10. I would have it understood, however, that both the background scene and the foreground scene may be moving pictures, or that the background scene may be in motion and the foreground stationary or still. Furthermore, in some instances, it may be found desirable to have a secondary foreground action, in which event an additional projecting machine may be used, the relative proportions of the illumination being regulated to obtain the proper values of the projected images, and present the complete scene to the best possible advantage.

The same effects which are obtainable by the practising of my invention with a translucent screen, as shown in Fig. 1, may be obtained by the use of an opaque screen made of any suitable material, upon which the background and foreground pictures are simultaneously projected from the front of the theater. Under these circumstances, the means employed for projecting the pictures will, of course, be known to the onlookers or spectators, but the illusion in the presentation itself will not be destroyed or seriously impaired. In some instances, the structure of the theater or other auditorium, or the like, in which the exhibition or presentation is to be made will not permit of the total concealment of the apparatus used, and in consequence the so-called front projection as just described must be resorted to.

In the modification illustrated in Fig. 2, I have shown a means of carrying out the objects of my invention by simultaneously projecting two pictures upon a screen, which is partly translucent and partly opaque, as indicated at 14 and 15, respectively. The background scene is projected from the front of the theater or auditorium by the stereopticon 11, while the foreground action is projected from the rear of the screen upon the translucent portion 14 thereof, by the projecting machine 10. The illumination in this method of carrying out my invention must be regulated similarly to that hereinbefore described and the results obtained are highly satisfactory, although it is apparent that the scope of movement of the foreground action upon the screen is limited by the size or dimensions of the translucent portion 14.

The projection of the two pictures simultaneously from the front and rear of the screen, as just described, may also be practised with a translucent screen, in which event the background projected from the front of the theater or auditorium covers or fills the entire screen, while the foreground subject or action projected from the rear of the screen covers only such portion or portions thereof as are required in the presentation.

It is obvious that as the light cones from both machines cover the entire screen, there is no limitation as to the places where any of the subjects in either picture may be made to appear, the only requirement being that there shall be a sufficient contrast in lighting effect between the adjacent points of the subjects on the several pictures.

In Fig. 3, I have illustrated diagrammatically the projection upon a single screen of three superposed views, machines 10 and 16 being moving picture machines and machine 11 a stereopticon. As shown, the latter instrument is employed to project the slide representing the background and its cone of light 13 covers the entire screen. The cones of light 12 and 17 from the moving picture machines are projected and superposed upon portions of the screen only and may be used to present any desired subjects.

In Fig. 4, a still further combination of machines is employed. For instance, stereopticon 11 by a light cone 13 covers substantially the entire screen; while moving picture machines 10 and 16 present light cones 12 and 17, respectively, upon the same side of the screen; whereas, the moving picture machine 18 throws a cone of light 19 and picture upon a portion of the opposite side of the screen.

In Fig. 5, I have represented a typical scene such as would be produced by the apparatus and method shown in Figs. 1 and 2. If two machines are employed, the background may be thrown by the stereopticon upon the entire screen and would cover the entire surface. It will be understood that the complete picture will consist of the distant, i. e., the mountains, clouds and the heavy foliage, (which upon the background screen would be dark in color all the way down to the bottom 20). Upon the dark background is thrown the moving picture scene which would contain the floor of the platform, the horse and the human figure. The floor being much lighter than the lower part of the fixed scene, would appear clearly as in the illustration, and so long as the horse remained sufficiently in the foreground as not to register with any of the dark portion of the background, he would stand out distinctly as shown. Similarly, the human figure will appear distinct anywhere upon the platform against the darker background, and a scene employing such a floor possesses the characteristic that the back-ground appears to begin only at the rear of the platform.

Assuming that the scene of Fig. 5 is produced by means of two moving picture machines, then a similar result is obtained. The background film may represent the mountains, sky, clouds, foliage, etc., the latter of which may be moving in the breeze, the foreground of this picture being sufficiently dark, the second moving picture, depicting the platform, horse and human figure, will be projected thereon, and the characters will stand out with a similar degree of distinctness providing the relative lighting of the two pictures is properly regulated.

It will be obvious that various combinations of scenes, whether still life or moving picture views, may be used, and the results obtained can be varied to meet almost every natural condition.

Where several pictures are employed showing objects in distant and near zones, the picture of the subject-matter in each zone may be sharply focused and thus the combination picture will have the appearance of depth and perspective, which is extremely lifelike and closely approximates a similar view seen by ordinary vision.

This application is a continuation in part of my co-pending application for Letters Patent filed August 14th, 1920, Serial No. 403,566 and is filed as a continuation and substitute for so much of said application as relates to subject-matter common to both.

It will be apparent that my invention is susceptible of diversified uses as hereinbefore set forth. As an example my method and apparatus may be employed for producing scenic effects in threatrical and other productions, in which the story or action is carried out, or performed by living actors. Under such circumstances, it might be found desirable to employ two still pictures, one to provide the background effect while the other produces the foreground, the background and foreground apparently occupying different planes or zones and producing a scenic effect similar to that which would be obtained by a stage set. This and other uses of my method and apparatus will present themselves to those skilled in the art, to which this invention appertains, and I would have it clearly and distinctly understood that all such uses, together with such changes in the preparation and projection of films or slides, as may be necessary or desirable to carry out the objects of my invention, are clearly within the spirit and scope thereof as defined in the following claims.

What I claim is:

1. The method of producing the appearance of solidity or relief in projected pictures, wherein the images of a plurality of sharply focused photographs, each representing subject-matter unlike to that of the other disposed in a distinct zone and having a different focal distance, are superposed upon a screen.

2. The method of producing the appearance of solidity or relief in projected action pictures wherein the images of a plurality of sharply focused photographs, each representing subject-matter unlike to that of the other disposed in a distinct zone and having a different focal distance, are superposed upon a screen, one of the photographs being of the moving picture type.

3. The method of producing the appearance of solidity or relief in projected action pictures wherein the images of a plurality of sharply focused photographs, each representing subject-matter unlike to that of the other disposed in a distinct zone and having a different focal distance, are superposed upon a screen, one of the photographs being of the moving picture type, and the relative intensity of illumination of the images is adjusted.

4. The method of producing the appearance of solidity or relief in projected pictures, which comprises producing upon a screen an image portraying a closely focused scene representing subject-matter in a distant zone, and rendering portions thereof invisible by simultaneously producing upon the same screen an image portraying a closely focused scene representing subject-matter of contrasting character in a foreground zone.

5. The method of producing the appearance of solidity or relief in projected action pictures, which comprises producing upon a screen an image portraying a scene representing at one focal distance subject-matter in a distant zone, and rendering portions thereof invisible by simultaneously producing upon the same screen an image portraying a closely focused scene at a nearer focal distance representing moving subject-matter of contrasting character in a foreground zone.

6. The method of producing the appearance of solidity or relief in projected action pictures, which comprises producing upon a screen an image portraying a closely focused scene representing subject-matter in a distant zone, rendering portions thereof invisible by simultaneously producing upon the same screen an image portraying a closely focused scene representing moving subject-matter of contrasting character in a foreground zone, and adjusting the relative intensity of illumination of the images.

7. The method of producing the appearance of solidity or relief in projected pictures, which comprises illuminating comparatively dark portions of a screen image portraying a closely focused scene representing subject-matter in a distant zone by brighter portions of an image of another closely focused scene in a foreground zone.

8. The method of producing the appearance of solidity or relief in projected action pictures, which comprises illuminating comparatively dark portions of a screen image representing subject-matter in one zone at one focal distance by brighter portions of an image of a closely focused scene of moving subject-matter in another zone at another focal distance.

9. The method of producing the appearance of solidity or relief in projected action pictures, which comprises illuminating comparatively dark portions of a screen image representing subject-matter in a distant zone at one focal distance by brighter portions of an image of a closely focused scene of moving subject-matter in a foreground zone, at a nearer focal distance, and adjusting the relative intensity of illumination of the images.

10. The method of producing the appearance of solidity or relief in projected pictures, which comprises projecting upon a single screen a plurality of sharply focused photographic views in superposed relation, each photographic view representing subject-matter in sharp focus in a zone different from the zone of focus of the other photograph.

11. The method of producing the appearance of solidity or relief in projected action pictures, which comprises projecting upon a single screen a plurality of sharply focused photographic views in superposed relation, each photographic view representing subject-matter in sharp focus in a zone different from the zone of focus of the other photograph, at least one of the subject-matters represented being in action.

12. The method of producing the appearance of solidity or relief in projected action pictures, which comprises projecting upon a single screen a plurality of photographic views in superposed relation, each photograph representing subject-matter in sharp focus in a zone different from the zone of focus of the other photograph, the subject-matter in a remoter zone being "still" and that in a nearer zone being in action.

13. The method which comprises the projection upon a single screen of a plurality of ocular views, reproduced in the form of sharply focused photographs, each of unlike contrasting subject-matter in a different zone and taken at different focal distances, to produce a scene having the appearance of solidity or relief.

14. The method which comprises the projection upon a single screen of a plurality of ocular views, reproduced in the form of sharply focused still and moving photographs, each of unlike contrasting subject-matter in a different zone and taken at different focal distances, to produce a scene having the appearance of solidity or relief.

15. The method of producing the appearance of solidity or relief in projected pictures, comprising the projection of a series of closely focused photographic views of unlike subject-matter in different zones and taken at different focal distances upon a single screen simultaneously and in superposed relation, each of the views being of such a character that high light portions of one register with naturally substantially darker portions of the other pictures, so that the said high light is thrown upon a relatively unilluminated portion of the screen.

16. The step in the method of producing the appearance of solidity or relief in projected pictures, which consists in eliminating dark foreground portions of a screen image portraying a closely focused view of a background scene by projecting thereon highlights representing closely focused action in a foreground zone.

17. The method of producing pictures by projection, comprising first producing a plurality of closely focused pictures of separately viewed objects at substantially different focal distances, and then simultaneously projecting said pictures in superposed relation on a common screen, whereby the merged pictures bear an appropriate perspective to each other and create the optical impression of distance between forwardly and rearwardly located objects, to effect the appearance of relief of predetermined portions of the combined picture.

18. The method of producing the appearance of solidity or relief in projected pictures which comprises producing upon a sharply focused scene at a predetermined focal distance, an image depicting a scene and then rendering portions thereof invisible by simultaneously producing upon the same screen an unmasked image depicting another sharply focused scene at a different focal distance, said scene being of a contrasting character.

19. An illusion producing apparatus, comprising a screen, a plurality of projecting machines trained on the screen, each projecting machine being provided with a light-intercepting and controlling device, each device being of preconceived design and representing at sharp focus subject-matter in different zones and at different focal distances, whereby said subject-matters may be superposed on the screen, said designs being so interrelated that their respective images appear in relief when superposed, one of said devices being a closely focused photograph.

20. An illusion producing apparatus, comprising a screen, a plurality of projecting machines trained on the screen, each projecting machine being provided with a closely focused photographic light-intercepting and controlling device, each device being of preconceived design and representing subject-matter in different zones and at different focal distances, whereby said subject-matters may be superposed on the screen, said designs being so interrelated that their respective images appear in relief when superposed, at least one of the said projecting machines being a moving picture machine.

21. An illusion producing apparatus, comprising a screen, a stereopticon trained upon said screen and having a light-intercepting and controlling means associated therewith, said means constituting a representation at one focal distance of a background scene, and a background scene, a moving picture machine also trained on said screen and having a film carrying closely focused photographs associated therewith said photographs representing a moving picture of subject-matter having a focal distance different from that of the background scene, whereby the subject-matters of the two pictures may be superposed on the screen so that their respective images appear in relief.

22. The combination with a screen, and a plurality of projecting machines trained thereon, of closely focused photographic light-intercepting and controlling devices associated with each machine, said devices being unlike one to the other and representing subject-matter disposed in different zones and at different focal distances, said devices being so interrelated that high-light portions of one scene do not register with substantially similar high-light portions of another scene, whereby the combined picture projected will produce upon the screen distinct images which possess the appearance of solidity or relief.

23. An illusion producing apparatus comprising a screen, projecting instrumentalities trained on the screen, and light-intercepting and controlling devices associated with the projecting instrumentalities, said devices being in the form of sharply focused photographs taken at different focal distances and representing unlike subject-matter of predetermined design disposed in different zones, whereby the illusion of solidity or relief is produced by simultaneous projection onto the screen.

HERMAN ARMOUR SMITH.